US012782113B2

(12) United States Patent
Hidaka

(10) Patent No.: US 12,782,113 B2
(45) Date of Patent: Nov. 3, 2026

(54) COORDINATE MEASURING MACHINE AND IN-LINE MEASUREMENT SYSTEM

(71) Applicant: MITUTOYO CORPORATION, Kanagawa (JP)

(72) Inventor: Kazuhiko Hidaka, Tokyo (JP)

(73) Assignee: MITUTOYO CORPORATION, Kanagawa (JP)

( * ) Notice: Subject to any disclaimer, the term of this patent is extended or adjusted under 35 U.S.C. 154(b) by 357 days.

(21) Appl. No.: 18/590,527

(22) Filed: Feb. 28, 2024

(65) Prior Publication Data

US 2024/0302159 A1 Sep. 12, 2024

(30) Foreign Application Priority Data

Mar. 6, 2023 (JP) ................................ 2023-033859

(51) Int. Cl.
*G01B 11/00* (2006.01)

(52) U.S. Cl.
CPC .................................. *G01B 11/005* (2013.01)

(58) Field of Classification Search
CPC .................................................... G01B 11/005
USPC .................................................... 33/502, 503
See application file for complete search history.

(56) References Cited

U.S. PATENT DOCUMENTS 4,562,392 A * 12/1985 Davis ................ G05B 19/4015 318/632
4,620,281 A * 10/1986 Thompson ......... G05B 19/4065 73/104
8,140,178 B2 * 3/2012 Hon ......................... G01B 5/20 700/192
8,244,396 B2 * 8/2012 Terai .................... B23Q 39/021 82/149
9,207,059 B2 * 12/2015 Schon .................... G01B 5/008
9,605,943 B2 * 3/2017 Shimaoka .............. G01B 5/012
10,048,065 B2 * 8/2018 Ould .................... G01B 21/047
10,900,765 B2 * 1/2021 Shimaoka ............ G01B 5/0009
11,162,776 B2 * 11/2021 Holzapfel .............. G01B 11/26
12,257,707 B2 * 3/2025 Jonas ..................... B25J 9/0084
12,533,764 B2 * 1/2026 Kuriya ................... B23Q 17/20
2007/0033819 A1 * 2/2007 McFarland ............ G05B 19/19 33/551
2023/0294918 A1 * 9/2023 Zheng ...................... B25J 11/00
2023/0415429 A1 * 12/2023 Rabiega .................. B29C 70/38
(Continued)

FOREIGN PATENT DOCUMENTS

DE 102010047284 A1 * 3/2012 ............. G01B 11/03
EP 2244053 A1 * 10/2010 ............. G01B 5/008
(Continued)

*Primary Examiner* — George B Bennett
(74) *Attorney, Agent, or Firm* — Greenblum & Bernstein, P.L.C.

(57) ABSTRACT

A production line in which a workpiece is conveyed through a conveyance path and machined with a machine tool is provided with a coordinate measuring machine capable of measuring the workpiece subjected to machining with the machine tool, whereby an in-line measurement system is provided. The coordinate measuring machine includes: a measuring machine body located beside the machine tool; a support extending from the measuring machine body to the machine tool; and a probe supported by the support and configured to measure the workpiece subjected to machining with the machine tool.

4 Claims, 6 Drawing Sheets

(56) References Cited

U.S. PATENT DOCUMENTS

| | | | | |
|---|---|---|---|---|
| 2024/0001503 | A1* | 1/2024 | Breitzke | G05B 19/401 |
| 2024/0142229 | A1* | 5/2024 | Buckingham | G01B 21/047 |
| 2025/0235957 | A1* | 7/2025 | Rahman | B23B 35/00 |

FOREIGN PATENT DOCUMENTS

| | | | |
|---|---|---|---|
| JP | 2000-55644 | A | 2/2000 |
| JP | 2016-80507 | A | 5/2016 |

* cited by examiner

COORDINATE MEASURING MACHINE AND IN-LINE MEASUREMENT SYSTEM

CROSS REFERENCE TO RELATED APPLICATIONS

The entire disclosure of Japanese Patent Application No. 2023-033859 filed Mar. 6, 2023 is expressly incorporated by reference herein.

TECHNICAL FIELD

The present invention relates to a coordinate measuring machine and an in-line measurement system that measure a workpiece on a production line.

BACKGROUND ART

For a production line in which a machine tool is used, an in-line measurement system is used to measure the shape and dimension of a workpiece subjected to machining with the machine tool without the necessity of taking out the workpiece from the machine tool.

For instance, a coordinate measuring machine is located in the middle of a production line including a machine tool and in-line measurement of the shape and dimension of a workpiece subsequently machined with the machine tool is performed (see, Patent Literature 1: JP 2000-55644 A).

Further, a touch signal probe is attached to a machine tool located in a production line and on-machine measurement of the shape and dimension of a workpiece being machined is performed, that is, the machine tool also serves as a coordinate measuring machine (see, Patent Literature 2: JP 2016-80507 A).

It is possible for Patent Literature 1 to measure the workpiece fed from the machine tool using the coordinate measuring machine located in the middle of the production line. However, it is not possible for Patent Literature 1 to measure a workpiece under machining with the machine tool.

It is possible for Patent Literature 2 to measure the workpiece under machining. However, in order to enable the machine tool to be used for machining and measurement, a cutter is attached to a main shaft during machining and the probe is attached to the main shaft during measurement. In other words, replacement with the probe is required for each measurement, which inevitably leads to a decrease in working efficiency.

There is thus a demand for efficiently performing measurement of a workpiece under machining with a machine tool.

SUMMARY OF THE INVENTION

An object of the invention is to provide a coordinate measuring machine and an in-line measurement system that are capable of efficiently measuring a workpiece under machining with a machine tool.

According to an aspect of the invention, there is provided a coordinate measuring machine configured to measure a workpiece subjected to machining with a machine tool, the coordinate measuring machine including: a measuring machine body located beside the machine tool; a support extending from the measuring machine body to the machine tool; and a probe supported by the support, the probe being configured to measure the workpiece subjected to machining with the machine tool.

According to the aspect of the invention, the support extends from the measuring machine body located beside or adjacent to the machine tool to introduce the probe in a working area of the machine tool, thereby performing measuring a three-dimensional shape of the workpiece. A contact touch probe or scanning probe, a non-contact line laser probe or roughness measuring probe, or the like is usable as the probe as appropriate.

According to the aspect of the invention, it is possible to measure the workpiece under machining by extending the support from the measuring machine body while the machining is performed on the work piece with the machine tool. It is unnecessary to perform, for instance, replacement of a tool of the machine tool and the probe at the time of workpiece measurement. It is thus possible to efficiently perform measurement of the workpiece under machining with the machine tool.

In the coordinate measuring machine according to the aspect of the invention, a displacement detection unit is preferably provided for the support, the displacement detection unit being configured to detect displacement of a portion supporting the probe relative to the measuring machine body.

According to the aspect of the invention, the coordinate measuring machine is capable of correcting displacement based on deformation or the like of the support by causing the displacement detection unit to detect displacement of the portion supporting the probe of the support relative to the measuring machine body.

The displacement includes displacement in two axes orthogonal to a longer direction of the support (e.g., a vertical direction and a horizontal direction) and displacement in the longer direction of the support. In the aspect of the invention, a main cause of the deformation of the support is bowing downward of the support due to gravity, and thus the correction of the displacement in the vertical direction of the portion supporting the probe of the support is most needed.

A high-accuracy distance measurement device such as a laser interferometer is usable to detect the displacement in the longer direction of the support. For the displacement in two axes orthogonal to the longer direction of the support, it is possible to use, for instance, a configuration including a two-dimensional sensor that receives a laser beam parallel to the support.

In a known coordinate measuring machine, three axial coordinates of a probe are detected using, for instance, respective scales in axial directions located in a measuring machine body. When the measuring machine body is distant from the machine tool, a portion near the measuring machine body of the support is distant from the portion supporting the probe of the support. This may increase displacement of the portion supporting the probe of the support relative to the measuring machine body, and reduce the measurement accuracy on the measuring machine body side. In contrast, detecting the deformation of the support by the displacement detection unit and correcting a measurement value in the measuring machine body results in the efficient measurement with high accuracy.

In the coordinate measuring machine according to the aspect of the invention, the displacement detection unit preferably includes: a reflector located at the portion supporting the probe of the support; a laser interferometer located near the measuring machine body in the support, the laser interferometer being configured to form a laser beam between the laser interferometer and the reflector; a beam splitter located on a light-incident side of the reflector, the beam splitter being configured to divide and deliver the laser beam toward the measuring machine body; and a two-dimensional sensor configured to receive the laser beam from the beam splitter and detect a two-dimensional light-receiving position of the laser beam.

According to the aspect of the invention, it is possible to detect the displacement in the longer direction of the support using the laser interferometer and detect the displacement in the two axial directions intersecting with the longer direction of the support using the two-dimensional sensor. In this configuration, the laser beam to be detected by the two-dimensional sensor is created by dividing the laser beam of the laser interferometer, which makes it possible to simplify the structure and reduce a running power.

In the coordinate measuring machine according to the aspect of the invention, the support is preferably provided with an inclination detection unit configured to detect an inclination in a longer direction of the support at the portion supporting the probe.

According to the aspect of the invention, the inclination detection unit is capable of detecting the inclination in the longer direction of the support at the portion supporting the probe of the support. For instance, when the displacement detection unit detects displacement in two axial directions intersecting with the longer direction of the support at the portion supporting the probe relative to a portion near the measuring machine body of the support, the amounts of the displacement detected each include effects of not only a translation component but also a rotational component of the portion supporting the probe. Here, detecting the rotational component from the inclination of the portion supporting the probe by the inclination detection unit makes it possible to perform a calculation to correct the rotational component and the translation component together, resulting in a suitable correction.

According to another aspect of the invention, there is provided an in-line measurement system including: a machine tool configured to machine a workpiece; and a coordinate measuring machine configured to measure the workpiece supported by the machine tool, the coordinate measuring machine including: a measuring machine body located beside the machine tool; a support extending from the measuring machine body to the machine tool; and a probe supported by the support, the probe being configured to measure the workpiece subjected to machining with the machine tool.

The in-line measurement system according to such an aspect of the invention is capable of producing effects as described in relation to the coordinate measuring machine according to the aspect of the invention.

According to the above aspects of the invention, there can be provided a coordinate measuring machine and an in-line measurement system that are capable of efficiently measuring a workpiece under machining with a machine tool.

DETAILED DESCRIPTION

Figure 1:
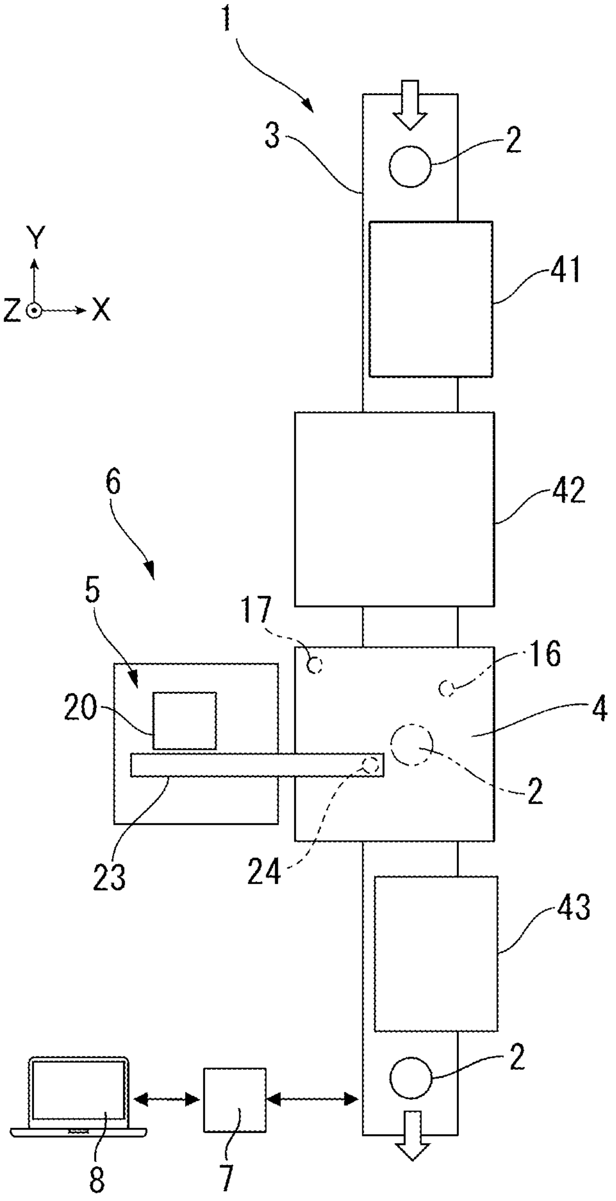
FIG. 1 is a plan view illustrating a production line of an exemplary embodiment of the invention.

Referring to FIG. 1, a production line 1 includes a conveyance path 3 through which a workpiece 2 is to be conveyed. A plurality of machine tools 4, 41, 42, and 43 that machine the workpiece 2 are located in the middle of the conveyance path 3. A coordinate measuring machine 5 that performs in-line measurement of the workpiece 2 subjected to machining with the machine tool 4 is located beside the machine tool 4.

A controller 7 and an operation terminal 8 are connected to the production line 1 and the coordinate measuring machine 5. The controller 7 controls a conveyance operation of the workpiece 2 through the production line 1 and a machining operation with the machine tools 4 and 41 to 43 in accordance with operation instructions from the operation terminal 8. Further, the controller 7 causes the coordinate measuring machine 5 to perform a measurement operation of the workpiece 2 in conjunction with the conveyance operation and the machining operation in the production line 1. On the operation terminal 8, an operation state in the production line 1, a measurement result obtained by the coordinate measuring machine 5, and the like are displayed as appropriate.

The production line 1 and the coordinate measuring machine 5 provide an in-line measurement system 6.

Figure 2:
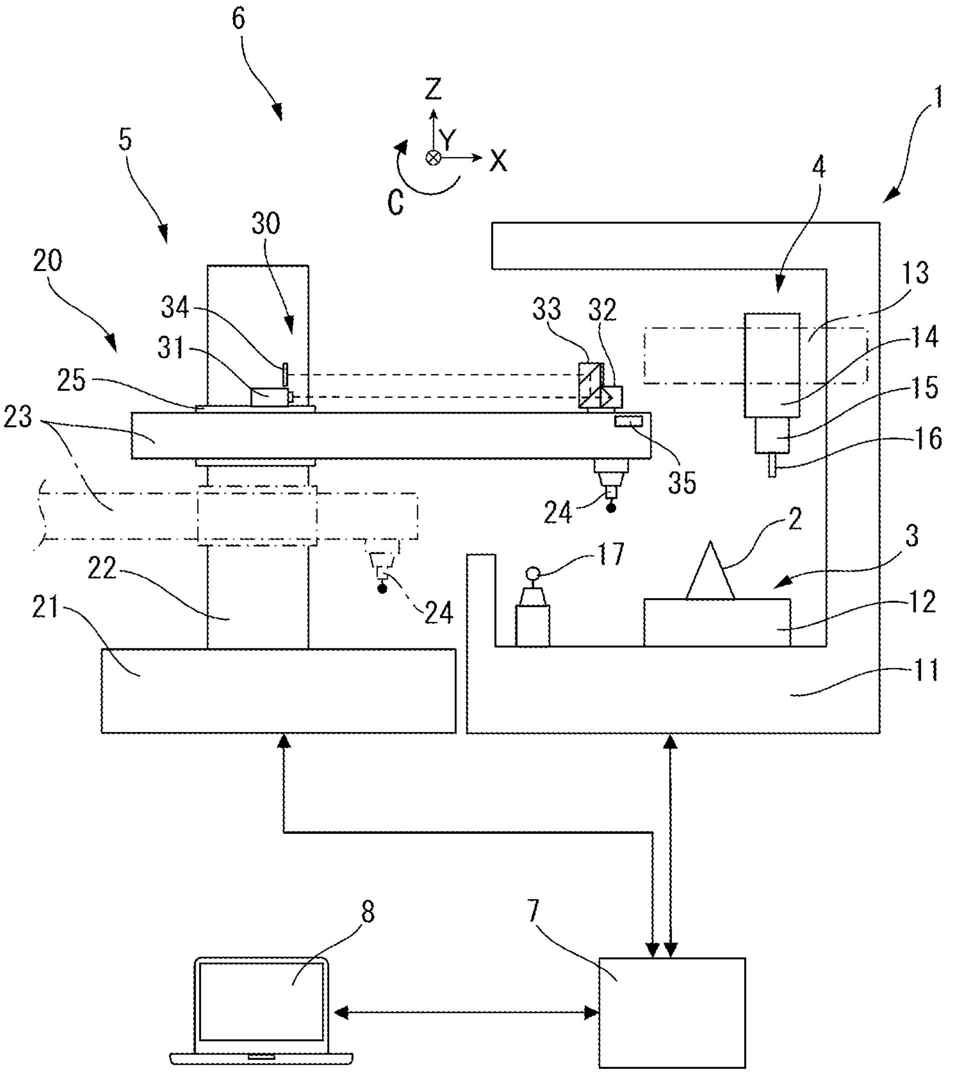
FIG. 2 is an elevational view illustrating a coordinate measuring machine and an in-line measurement system of the exemplary embodiment.

Referring to FIG. 2, the machine tool 4 includes a bed 11 fixed to a floor surface and a table 12 supported on an upper surface of the bed 11. The table 12 is a part of the conveyance path 3 of the production line 1 and the workpiece 2 is subsequently conveyed from an upstream side of the conveyance path 3 (an upper side in FIG. 1, a far side in FIG. 2) to an upper surface of the table 12.

A main shaft head 14 is supported by a triaxially movable motion mechanism 13 above the table 12. A main shaft 15, which is driven to rotate by an electric motor, is supported by the main shaft head 14. A tool 16 for cutting machining is attached to the main shaft 15.

In such a machine tool 4, the motion mechanism 13 causes the tool 16 to approach the workpiece 2 with the main shaft 15 being rotated, which makes it possible to perform cutting machining of the workpiece 2.

In the machine tool 4, a reference sphere 17, which is used for a calibration operation of the coordinate measuring machine 5, is located on the upper surface of the bed 11.

In the coordinate measuring machine 5, the calibration operation of the probe 24 is performed by detecting a surface of the reference sphere 17 with the probe 24.

The calibration operation using the reference sphere 17 is basically performed once at the time of the start of the production line 1 and the coordinate measuring machine 5. The calibration operation of the coordinate measuring machine 5, however, may be performed as needed.

Although being different from one another in accordance with respective details of machining, the other machine tools 41 to 43 located in the production line 1 are each similar in configuration to the machine tool 4.

Referring to FIG. 2, the coordinate measuring machine 5 includes a measuring machine body 20 located beside the production line 1, a support 23 extending from the measuring machine body 20 to the production line 1, and the probe 24 that is supported by the support 23 and that is capable of measuring the workpiece 2 conveyed through the conveyance path 3.

The measuring machine body 20 includes a bed 21 that is fixed to the floor surface around the machine tool 4 and a column 22 that is supported on an upper surface of the bed 21. A block 25 is supported on a side surface of the column 22 such that the block 25 is movable up and down. The horizontally extending elongated support 23 is supported by the block 25.

The support 23 has a sufficient length to reach the upper surface of the table 12 of the machine tool 4 from the measuring machine body 20, allowing the probe 24 supported at a distal end to come into contact with the workpiece 2 supported on the table 12.

A contact touch probe or scanning probe, a non-contact line laser probe or roughness measuring probe, or the like is usable as the probe 24 as appropriate.

A non-illustrated Y-axial motion mechanism is located between the bed 21 and the column 22, and the column 22, the block 25, the support 23, and probe 24 are movable in a Y-axis direction (a depth direction in FIG. 2, a horizontal direction out of two axes orthogonal to a longer direction of the support 23) with respect to the bed 21.

A non-illustrated Z-axial motion mechanism is located between the column 22 and the block 25, and the block 25, the support 23, and the probe 24 are movable up and down in a Z-axis direction (an up-and-down direction in FIG. 2, a vertical direction out of the two axes orthogonal to the longer direction of the support 23) with respect to the column 22 and the bed 21.

A non-illustrated X-axial motion mechanism is located between the block 25 and the support 23, and the support 23 and the probe 24 are movable in an X-axis direction (a right-and-left direction in FIG. 2, the longer direction of the support 23) with respect to the column 22 and the bed 21.

The respective amounts of the X-, Y-, and Z-axial motions are detectable using non-illustrated respective scales located along the axes.

In such a coordinate measuring machine 5, the controller 7 controls the respective axial motion mechanisms to advance the probe 24 supported at the distal end of the support 23 above the table 12 of the machine tool 4 and to bring the probe 24 into contact with the workpiece 2. A three-dimensional coordinate position of a surface of the workpiece 2 can be measured by detection of respective amounts of the axial motions based on when the probe 24 detects a contact with the workpiece 2.

A displacement detection unit 30 is provided for the support 23 of the coordinate measuring machine 5. The displacement detection unit 30 detects displacement of a portion supporting the probe 24 relative to the measuring machine body 20.

A laser interferometer 31 and a two-dimensional sensor 34 are located in the block 25. A reflector 32 and a beam splitter 33 are located in the distal end of the support 23 attached with the probe 24.

Figure 3:
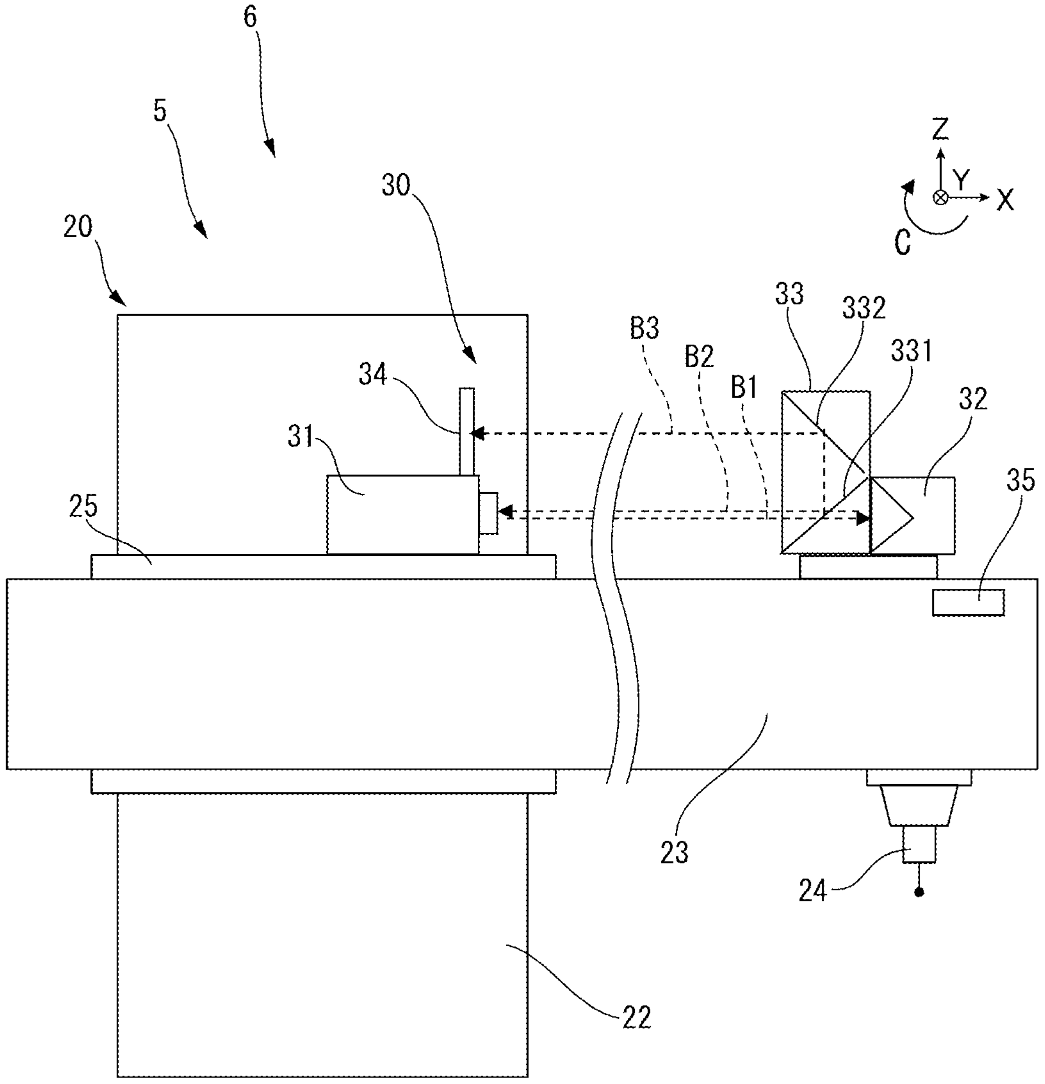
FIG. 3 is an elevational view illustrating a displacement detection unit of the exemplary embodiment.

Referring to FIG. 3, the laser interferometer 31 forms a laser beam B1 parallel to the support 23, and a laser beam B2 reflected by the reflector 32 is returned to the laser interferometer 31. The laser interferometer 31, which measures a distance to the reflector 32 with reference to the laser beam B2, is capable of measuring a position in the X-axis direction of the probe 24 relative to a machine coordinate system of the measuring machine body 20 with high accuracy.

The beam splitter 33 includes half mirrors 331 and 332. The half mirror 331 is located on a light-incident side of the reflector 32 to divide the laser beam B1 from the laser interferometer 31, and the half mirror 332 forms a laser beam B3 parallel to the support 23 that returns toward the measuring machine body 20.

The two-dimensional sensor 34 receives the laser beam B3 from the beam splitter 33 and detects a two-dimensional light-receiving position of the laser beam B3.

The two-dimensional sensor 34, which may be, for instance, a two-dimensional PSD (a two-dimensional position detection sensor) using a surface resistance of a photodiode, is capable of obtaining continuous X-coordinate and Y-coordinate electrical signals and is excellent in position resolution and responsiveness. The two-dimensional sensor 34 may also be a two-dimensional image sensor including a charge-coupled device (CCD).

Figure 4:
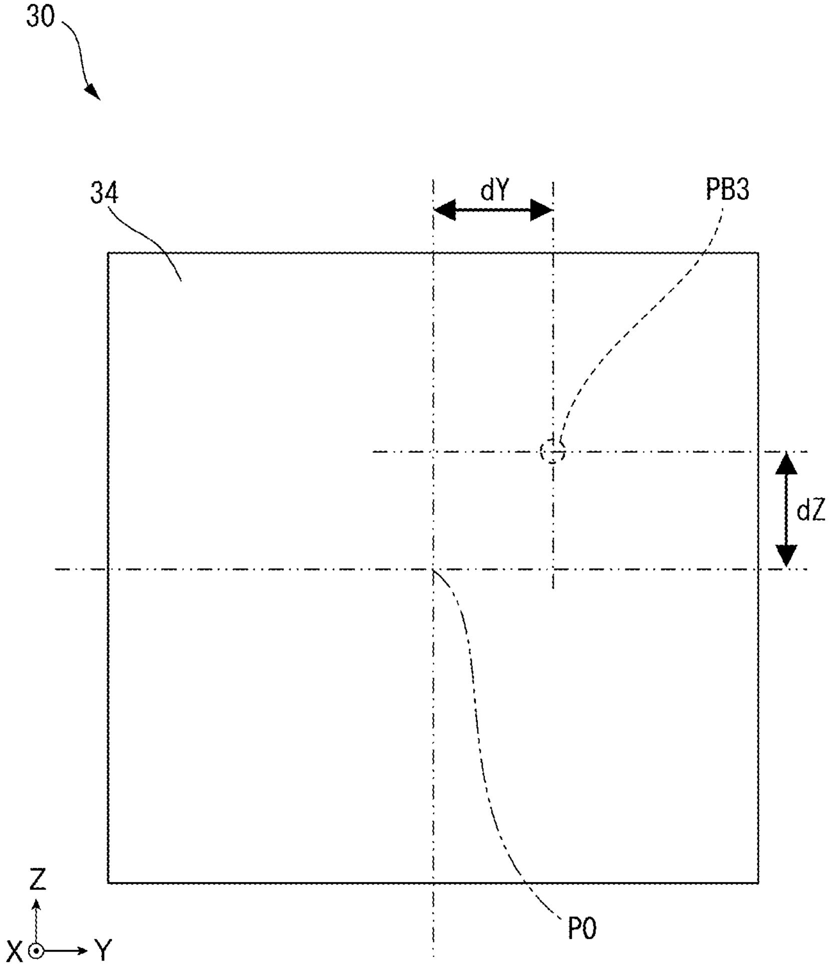
FIG. 4 is a front view illustrating a two-dimensional sensor of the exemplary embodiment.

FIG. 4 illustrates a light-receiving state of the laser beam B3 in the two-dimensional sensor 34.

The two-dimensional sensor 34, which is a panel-shaped sensor including a two-dimensional array of fine optical sensors, is capable of detecting displacement dZ in the Z-axis direction and displacement dY in the Y-axis direction of a light-receiving position PB3 of the laser beam B3 from a reference position P0.

When the support 23 is at a designed reference position with respect to the measuring machine body 20, the light-receiving position PB3 of the laser beam B3 in the two-dimensional sensor 34 is the reference position P0. When the support 23 is deformed or displaced relative to the measuring machine body 20, the light-receiving position PB3 of the laser beam B3 in the two-dimensional sensor 34 is deviated from the reference position P0, resulting in the occurrence of the displacements dY, dZ.

The deformation or displacement of the support 23 relative to the measuring machine body 20 leads to respective errors in the axial positions of the probe 24 measured using the Y- and Z-axis scales of the measuring machine body 20. In the exemplary embodiment, the two-dimensional sensor 34 detects the displacements dY and dZ and the controller 7 performs a geometric calculation based on the displacements dY and dZ to correct the Y- and Z-axial positions. This makes it possible to highly accurately maintain the measured three-dimensional coordinate position of the surface of the workpiece 2.

In the above displacement detection unit 30, the displacements dY and dZ detected by the two-dimensional sensor 34 include displacement (translation components) attributed to deviations in the axial directions of the support 23 and the probe 24 as a whole and displacement (rotational components) attributed to inclinations of a portion supporting the probe 24 relative to a supporting portion of the measuring machine body 20 due to a bend of a longer axis line of the support 23.

Figure 5:
FIG. 5 is a schematic diagram illustrating a translation component of displacement of a support of the exemplary embodiment.
Figure 6:
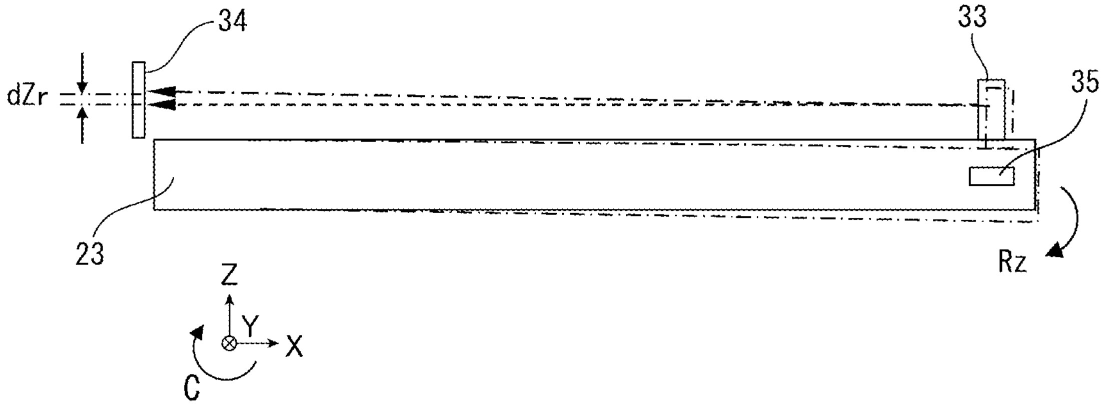
FIG. 6 is a schematic diagram illustrating a rotational component of the displacement of the support of the exemplary embodiment.

For instance, the deformation of the support 23 depends to a large extent on a larger downward displacement in the Z-axis direction due to gravity, and the displacement dZ in the Z-axis direction is a composition of a translation component dZt and a rotational component dZr illustrated in FIG. 5 and FIG. 6.

Referring to FIG. 5, the support 23 is displaced downward as a whole with respect to the supporting portion of the measuring machine body 20 mainly by gravity, and the amount of displacement is the translation component dZt parallel to the Z-axis.

Referring to FIG. 6, an effect of gravity on the support 23 deforms the support 23 so that a portion near the probe 24 bends downward with respect to a portion near the measuring machine body 20. The deformation resulting from the bend appears as an inclination Rz at the portion supporting the probe 24 of the support 23 and serves as the rotational component dZr in the two-dimensional sensor 34.

Accordingly, it is possible to compute the suitable translation component dZt to be applied to the correction of the Z-axial position, as a correction value, by detecting the inclination Rz at the portion supporting the probe 24, calculating the rotational component dZr, and then performing a correction calculation along with the displacement dZ that is the translation component in the Z-axis direction detected by the two-dimensional sensor 34.

The same applies to the displacement dY in the Y-axis direction, and thus it is possible to compute a translation component dYt to be applied to correction by detecting a rotational component dYr.

The support 23 of the coordinate measuring machine 5 is provided with an inclination detection unit 35, which detects an inclination (the inclination Rz in FIG. 6) in the longer direction of the support 23 relative to the measuring machine body 20 at the portion supporting the probe 24.

The inclination detection unit 35 may be, for instance, an inclination sensor that detects a gravity direction and measures an inclination of the portion supporting the probe 24 relative to the gravity direction. The inclination sensor may be, for instance, a mechanical sensor including a plumb bob or a pendulum, a MEMS (microelectromechanical system) sensor, a hydraulic sensor that detects a liquid surface, or the like.

In addition to the above, the inclination detection unit 35 may be an optical orientation sensor or the like. In a case where the laser interferometer 31 has an angle detection function, this function may be used. Such an optical sensor is favorable for detection of the rotational component dYr in the Y-axis direction irrelevant to gravity.

The exemplary embodiment produces the following effects.

In the exemplary embodiment, the production line 1 and the coordinate measuring machine 5 provide the in-line measurement system 6. In the in-line measurement system 6, the support 23 extends from the measuring machine body 20 located beside the production line 1 to introduce the probe 24 in the production line 1. This makes it possible to perform the in-line measurement of a three-dimensional shape of the workpiece 2.

In the exemplary embodiment, the measuring machine body 20 is located beside the production line 1, which eliminates the necessity of allocating a space for locating the coordinate measuring machine 5 in the middle of the production line 1. An increase in length of the production line 1 is thus avoidable.

This makes it possible to avoid an increase in length of the production line 1 and efficiently perform the in-line measurement using the dedicated coordinate measuring machine 5.

In the exemplary embodiment, the three axial coordinates of the probe 24 in the coordinate measuring machine 5 are basically detected using the respective scales in the axial directions located in the measuring machine body 20. The X-axis coordinate is also detectable by the laser interferometer 31. The X-axis coordinate may be detected only by the laser interferometer 31, and thus the detection using the scale in the X-axis direction located in the measuring machine body 20 may be omitted. Further, the coordinate measuring machine 5 is capable of correcting displacement based on deformation or the like of the support 23 by causing the displacement detection unit 30 to detect displacement of the portion supporting the probe 24 of the support 23 relative to the measuring machine body 20.

Specifically, the displacement detection unit 30 of the exemplary embodiment is capable of detecting displacement in the longer direction (the X-axis direction) of the support 23 using the laser interferometer 31 and the reflector 32 and detecting displacement in the two axial directions (the Y-axis direction and the Z-axis direction) intersecting with the longer direction of the support 23 using the two-dimensional sensor 34. In this configuration, the laser beam B3 to be detected by the two-dimensional sensor 34 is created by dividing the laser beam B1 of the laser interferometer 31 by the beam splitter 33, which makes it possible to simplify the structure and reduce a running power.

Further, in the exemplary embodiment, the inclination detection unit 35 detects an inclination in the longer direction of the support 23 at the portion supporting the probe 24 of the support 23, making it possible to suitably correct displacement based on deformation or the like of the support 23.

As described above, in the exemplary embodiment, the displacement detection unit 30 detects displacement in the two axial directions (the Y- and Z-axis directions) of the portion supporting the probe 24 relative to the portion of the support 23 near the measuring machine body 20, the two axial directions intersecting with the longer direction of the support 23. The amounts of the displacement in the Y- and Z-axis directions detected each include effects of not only the translation component but also the rotational component of the portion supporting the probe 24. Here, detecting the rotational component from the inclination of the portion supporting the probe 24 by the inclination detection unit 35 makes it possible to perform a calculation to correct the rotational component and the translation component together, resulting in a suitable correction.

It should be noted that the invention is by no means limited to the above-described exemplary embodiment and modifications and the like are within the scope of the invention as long as the object of the invention is achievable.

In the above exemplary embodiment, the production line 1 includes the conveyance path 3 and the machine tools 4, 41, 42, and 43, and the coordinate measuring machine 5 is located beside the machine tool 4. The invention is not limited thereto. Similar coordinate measuring machines 5 may be located beside the respective machine tools 41, 42, and 43. The number of the machine tools 4, 41, 42, and 43 may be three or less or five or more.

The configuration of the machine tool 4 is optional, and the machine tool 4 does not necessarily include the vertical main shaft 15 and may include a transverse main shaft. Further, the coordinate measuring machine 5 may have any configuration that supports the support 23 extending toward the production line 1 and is triaxially movable.

It is only necessary for the displacement detection unit 30 to detect displacement in the longer direction of the support 23 (the X-axis direction) and in the two axial directions (the Y-axis direction and the Z-axis direction) intersecting with the longer direction, and a high-accuracy displacement detector may be located along each of the axes. For instance, for the Z-axial displacement dZ and the Y-axial displacement dY, a high-accuracy displacement detector, for instance, a laser tracker, may be used for each of the axes in place of the two-dimensional sensor 34 using an X-axis beam of the laser interferometer 31. However, employing the configuration according to the above exemplary embodiment makes it possible to detect even the displacement in the Y-axis and Z-axis using the X-axis beam of the laser interferometer 31, resulting in a simple configuration.

In order to achieve high accuracy in the above exemplary embodiment, the rotational component is detected from the inclination at the portion supporting the probe 24 of the support 23 by using the inclination detection unit 35, and the translation component detected by the displacement detection unit 30 and the rotational component are subjected to a correction calculation together to suitably correct a measurement value. Here, the inclination detection unit 35 is not necessarily a gravity-based inclination sensor and may be a mechanism that performs an optical orientation detection. For instance, two pairs each having the two-dimensional sensor 34 and a mechanism using the laser beams B1, B3 may be located to detect a translation component and an inclination component.

In the above exemplary embodiment, the displacement dX in the longer direction of the support 23 (the X-axis direction), and the displacement dY and the displacement dZ in the two axial directions (the Y-axis direction and the Z-axis direction) intersecting with the longer direction are detected. However, since a main cause of the deformation of the support 23 is bowing downward of the support 23 due to gravity and the correction of the vertical displacement dZ of the portion supporting the probe 24 of the support 23 is most needed, the accuracy for the displacement dX in the X-axis direction and the displacement dY in the Y-axis direction may be reduced, simplified, or omitted.

What is claimed is:

1. A coordinate measuring machine configured to measure a workpiece subjected to machining with a machine tool, the coordinate measuring machine comprising:

a measuring machine body located beside the machine tool;

a support extending from the measuring machine body to the machine tool; and a probe supported by the support, the probe being configured to measure the workpiece subjected to machining with the machine tool, wherein a displacement detection unit is provided for the support, the displacement detection unit being configured to detect displacement of a portion supporting the probe relative to the measuring machine body.

2. The coordinate measuring machine according to claim 1, wherein the displacement detection unit comprises:

a reflector located at the portion supporting the probe of the support;

a laser interferometer located near the measuring machine body in the support, the laser interferometer being configured to form a laser beam between the laser interferometer and the reflector;

a beam splitter located on a light-incident side of the reflector, the beam splitter being configured to divide and deliver the laser beam toward the measuring machine body; and a two-dimensional sensor configured to receive the laser beam from the beam splitter and detect a two-dimensional light-receiving position of the laser beam.

3. The coordinate measuring machine according to claim 1, wherein the support is provided with an inclination detection unit configured to detect an inclination in a longer direction of the support at the portion supporting the probe.

4. An in-line measurement system comprising:

a machine tool configured to machine a workpiece; and a coordinate measuring machine configured to measure the workpiece supported by the machine tool, the coordinate measuring machine comprising:

a measuring machine body located beside the machine tool;

a support extending from the measuring machine body to the machine tool; and a probe supported by the support, the probe being configured to measure the workpiece subjected to machining with the machine tool, wherein a displacement detection unit is provided for the support, the displacement detection unit being configured to detect displacement of a portion supporting the probe relative to the measuring machine body.

* * * * *